US006208650B1

(12) United States Patent
Hassell et al.

(10) Patent No.: US 6,208,650 B1
(45) Date of Patent: Mar. 27, 2001

(54) CIRCUIT FOR PERFORMING HIGH-SPEED, LOW LATENCY FRAME RELAY SWITCHING WITH SUPPORT FOR FRAGMENTATION AND REASSEMBLY AND CHANNEL MULTIPLEXING

(75) Inventors: Suzanne Hassell, Clearwater; Patrick A. McCabe, Palm Harbor; Louis F. Villarosa, Jr., Tampa; Jeffrey E. Conner, Clearwater, all of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/054,194

(22) Filed: Apr. 2, 1998

Related U.S. Application Data

(60) Provisional application No. 60/068,964, filed on Dec. 30, 1997.

(51) Int. Cl.[7] ................................................. H04L 12/56
(52) U.S. Cl. .......................... 370/392; 370/401; 370/463; 370/474; 370/535
(58) Field of Search ................................. 370/389, 392, 370/401, 410, 412, 428, 432, 463, 465, 469, 470, 471, 474, 522, 524, 535

(56) References Cited

U.S. PATENT DOCUMENTS

| 5,533,017 | * | 7/1996 | Thor | 370/389 |
| 5,613,069 | * | 3/1997 | Walker | 370/355 |
| 5,896,383 | * | 4/1999 | Wakeland | 370/400 |
| 5,905,873 | * | 5/1999 | Hartmann et al. | 370/389 |
| 5,917,823 | * | 6/1999 | Benning et al. | 370/474 |

* cited by examiner

*Primary Examiner*—Alpus H. Hsu
(74) *Attorney, Agent, or Firm*—Thomas, Kayden, Horstemeyer & Risley, LLP

(57) ABSTRACT

The present invention is a hardware implementation of frame relay switching functions which provides for real time concurrent multiple processes by implementing the processes in dedicated hardware logic operating in parallel, whereas in a typical software implementation the processes are sequentially processed. While data structures in software based implementations are accessed on some multiple of a byte regardless of the logical structure of the data, in the hardware implementation of the present invention the physical widths and the logical widths of the data structure elements are identical. This allows direct access of the logical structure by the operating process.

51 Claims, 9 Drawing Sheets

| FRAME BUFFER DESCRIPTOR TABLE |
|---|
| Current Write Buffer Pointer |
| Current Write Byte Offset |
| Current Read Buffer Pointer |
| Current Write Byte Offset |
| Outbound DLCI |
| Outbound EDLCI |
| Outbound CID |
| DE CRC FECN BECN |
| RX FRF.11 Fragment Sequence No. |
| TX FRF.11 Fragment Sequence No. |
| RX FRF.12 Fragment Sequence No. |
| TX FRF.12 Fragment Sequence No. |
| Cut Thru Delay |

CIRCUIT FOR PERFORMING HIGH-SPEED, LOW LATENCY FRAME RELAY SWITCHING WITH SUPPORT FOR FRAGMENTATION AND REASSEMBLY AND CHANNEL MULTIPLEXING

CROSS REFERENCE TO RELATED APPLICATION

This document claims priority to and the benefit of the filing date of the copending provisional application entitled AN APPARATUS AND METHOD FOR PERFORMING HIGH-SPEED, LOW LATENCY FRAME RELAY SWITCHING WITH SUPPORT FOR FRAGMENTATION AND REASSEMBLY AND CHANNEL MULTIPLEXING, assigned Ser. No. 60/068,964, and filed Dec. 30, 1997, and is hereby incorporated by reference.

FIELD OF THE INVENTION

The present invention generally relates to frame relay networks, and more particularly, to a circuit for switching frame relay signals.

BACKGROUND OF THE INVENTION

In the field of data communications a modem is used to communicate information from one location to another. Digital Subscriber Line (DSL) technology now enables modems, or other devices such as frame relay data service units (DSU's), to communicate rapidly large amounts of data. This communication scheme generally adheres to a model, known as the Open Systems Interconnect (OSI) Seven-Layer model. This model specifies the parameters and conditions under which information is formatted and transferred over a given communications network. A general background of the OSI seven layer model follows.

In 1978, a framework of international standards for computer network architecture known as OSI (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a frame relay access device connected to a PC).

Layer 2, the datalink layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the datalink layer, and it is used by the transport layer. An example of the network layer is Internet Protocol (IP) which is the network layer for the Transmission Control Protocol over Internet Protocol (TCP/IP) widely used on Ethernet networks. In contrast to the OSI seven-layer architecture, TCP/IP is a five-layer architecture which generally consists of the network layer and the transport layer protocols.

The transport layer (Layer 4) determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression and format and code conversion.

Layer 7, the application layer, is used by the presentation layer to provide the user with a localized representation of data which is independent of the format used on the network. The application layer is concerned with the user's view of the network and generally deals with resource allocation, network transparency and problem partitioning.

The communications networks that operate within the OSI seven layer model include a number of paths or links that are interconnected to route voice, video, and data (hereinafter collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a circuit-switching network. Accordingly, a source node of one office at one location of the network may transmit data to a destination node of a second office located at another location of the network through their respective switching facilities.

At any given location, a large number of source nodes may desire to communicate through their respective switching facilities, or interconnect nodes, to destination nodes at various other locations of the network. The data traffic from the various source nodes is first multiplexed through the source switching facility, then demultiplexed at the destination switching facility and finally delivered to the proper destination node. A variety of techniques for efficiently multiplexing data from multiple source nodes onto a single circuit of the network are presently employed in private line networks. For instance, time division multiplexing (TDM) affords each source node full access to the allotted bandwidth of the circuit for a small amount of time. The circuit is divided into defined time segments, with each segment corresponding to a specific source node, to provide for the transfer of data from those source nodes, when called upon, through the network.

Other data communications systems, in contrast, have not been as successful employing multiplexing techniques to enhance network efficiency further. In particular, frame-relay networks offer far fewer alternatives than their circuit-switching network counterparts. Frame-relay networks are often referred to as packet-switching networks. Packet-switching networks, as opposed to circuit-switching networks, allow multiple users to share data network facilities and bandwidth rather than providing a specific amount of dedicated bandwidth to each user, as in TDM. Instead, packet switches divide bandwidth into connectionless, virtual circuits. As is known, virtual circuit bandwidth is consumed only when data are actually transmitted. Otherwise, the bandwidth is not used. In this way, packet-switching networks essentially mirror the operation of a statistical multiplexer (whereby multiple logical users share a single network access circuit). Frame relay operates within layer 2 (the data link layer) of the OSI model, and is an improvement over previous packet switching techniques, such as X.25, in that frame relay requires significantly less overhead.

Frame relay networks transport data packets by compressing and then transporting the packets over the communications channel. The communications channel can be provided by, for example, an ISDN (Integrated Services Digital Network) connection, however, other physical connections may be employed to transport frame relay data.

Frame relay is one of a series of data link protocols that fall within the broader class of data link protocols known as High-Level Data Link Control (HDLC). Typically, the frame relay data to be compressed and transported is packetized into standard High-Level Data Link Control—Unnumbered Information (HDLC-UI) Frame Relay packets in accordance with the Internet Engineering Task Force (IETF) Request for Comment (RFC) 1490. RFC 1490 defines the format of standard HDLC-UI frame relay packets. These standard packets are then compressed and transported over the frame relay network.

A frame relay network effectively comprises a mesh of interconnected nodes that can be variably configured to provide a communication path between a plurality of end points. A permanent virtual circuit is a configuration of various intermediate nodes in the frame relay service network which are dedicated to direct communications between a first end point and a second end point along a particular path.

Data link connection identifiers (DLCI's) are numbers that identify the various intermediate nodes between end points of a frame relay communication link. DLCI's identify the various intermediate nodes and therefore identify the particular communication path between end points. As is known, the provision of permanent virtual circuits simplifies the error control mechanisms for data transport utilizing frame relay technology, as opposed to communication links which are based on IP addresses and routers (where the communication path may vary from packet to packet).

Present frame relay switching devices process the flow of frame relay data and perform frame relay switching using a microprocessor under software control. The packets are sequentially processed by a microprocessor on data structures in a common memory. Data structures in microprocessor based implementations are accessed on some multiple of a byte regardless of the logic structure of the data. As a result, a software implementation cannot forward and switch an inbound packet until the entire packet has been received and is present in the microprocessor memory.

Accordingly, there is a clear need for an alternative implementation that provides for real time concurrent multiple processes, thereby reducing latency for symmetrical ports with DLCI switching. This is accomplished in the present invention by performing parallel processing of frame relay signals, which allows the frame relay access device to begin forwarding a packet as soon as the packet header is received (i.e., "cutting through" the packet) instead of waiting until the entire packet is present in the microprocessor memory, as is now done.

SUMMARY OF THE INVENTION

Certain objects, advantages, and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention is a hardware implementation of frame relay switching functions. The hardware architecture and dataflow is significantly different than currently implemented software architectures. The hardware architecture provides for real time concurrent multiple processes by implementing the processes in dedicated hardware logic operating in parallel, whereas in a typical software implementation the processes are sequentially processed. This is a key advantage of the present invention. While data structures in software based implementations are accessed on some multiple of a byte regardless of the logical structure of the data, in the hardware implementation of the present invention the physical widths and the logical widths of the data structure elements are identical. This allows direct access of the logical structure by the operating process.

The circuit of the preferred embodiment of the present invention provides a frame relay switch by implementing, in hardware, a receiving means for receiving a High-Level Data Link Control (HDLC) signal; an input processing means for processing the HDLC signal; a storing means for storing the processed HDLC signal; an output processing means for processing the stored HDLC signal for transmission; a transmitting means for transmitting the HDLC signal; and an interfacing means for interfacing the receiving means, input processing means, storing means, output processing means, and transmitting means to a central processing unit (CPU).

As implemented in the preferred embodiment, the circuit includes the following features:

Switching by DLCI;

Extended Data Link Control Identifier (EDLCI) multiplexing/demultiplexing. EDLCI multiplexing is a multiplexing method in which multiple permanent virtual circuits (PVCs) are multiplexed into one permanent virtual circuit (PVC) for transport across the frame relay network. EDLCI multiplexing is described in detail in commonly assigned U.S. Pat. No. 5,654,966 entitled "Circuit and Method for Multiplexing a Frame Relay Virtual Circuit and Frame Relay System Having Multiple Virtual Circuits," which is hereby incorporated by reference in this application;

FRF.11 multiplexing/demultiplexing. FRF.11 is an Implementation Agreement providing for Voice Over Frame Relay communications;

FRF.12 fragmentation/reassembly. FRF.12 is an Implementation Agreement providing for Frame Relay Fragmentation;

Cut-through of frame relay traffic; and

Mirroring of a port data stream to another port to support probing.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 7 is an illustration of the frame buffer descriptor (FBD) table of FIG. 3.

Figure 1:
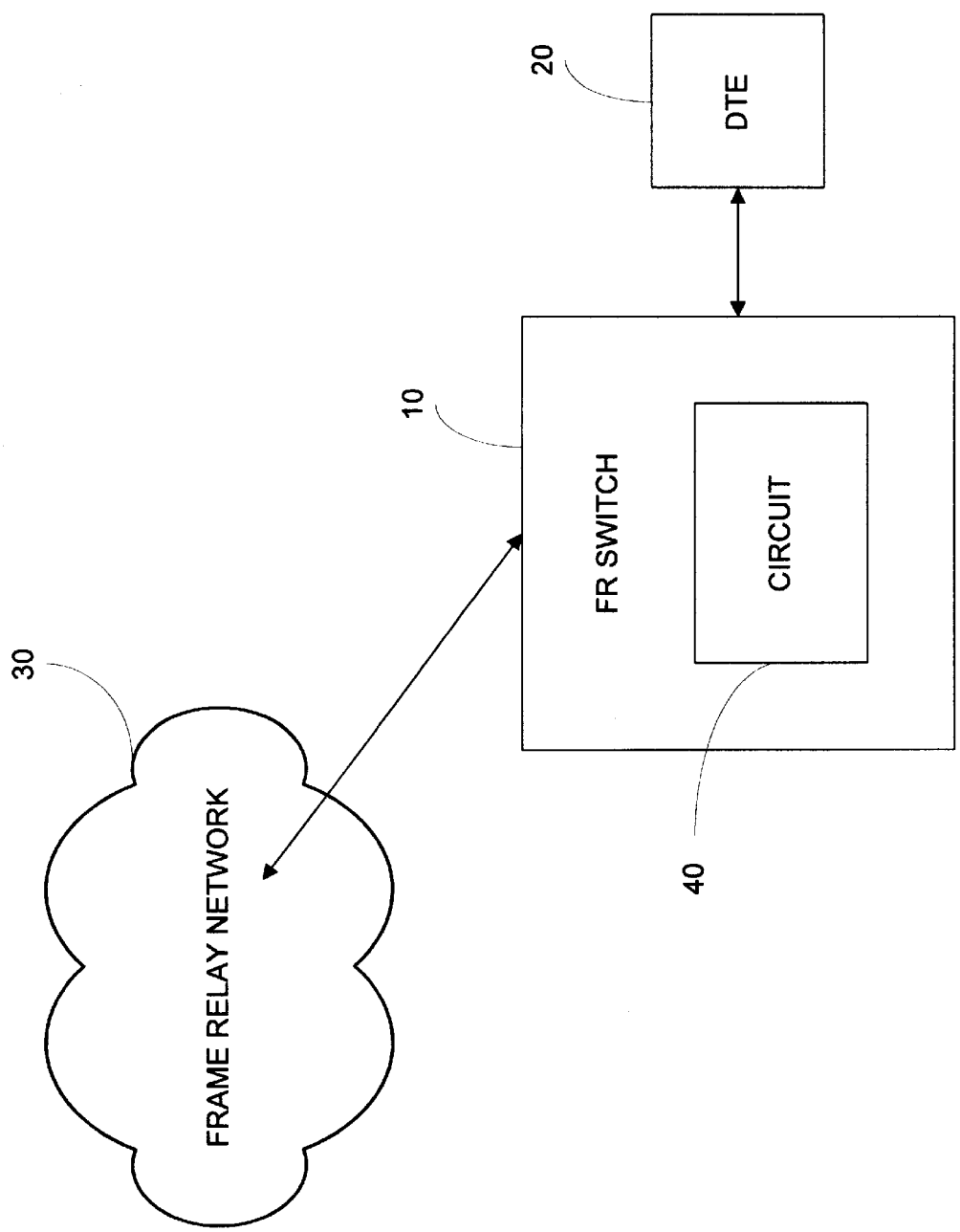
FIG. 1 is a simplified high level schematic diagram illustrating the use of the circuit of the present invention in a frame relay access device having a frame relay switch being used to connect data transmission equipment (DTE) to the frame relay network.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

The circuit of the present invention is a hardware implementation of the switching functions of a frame relay access device. FIG. 1 is a simplified high level schematic diagram illustrating a frame relay access device having a frame relay switch 10 being used to connect DTE 20 to the frame relay network 30. The circuit 40 of the present invention is a hardware implementation of the switching functions within the frame relay access device 10.

Figure 2:
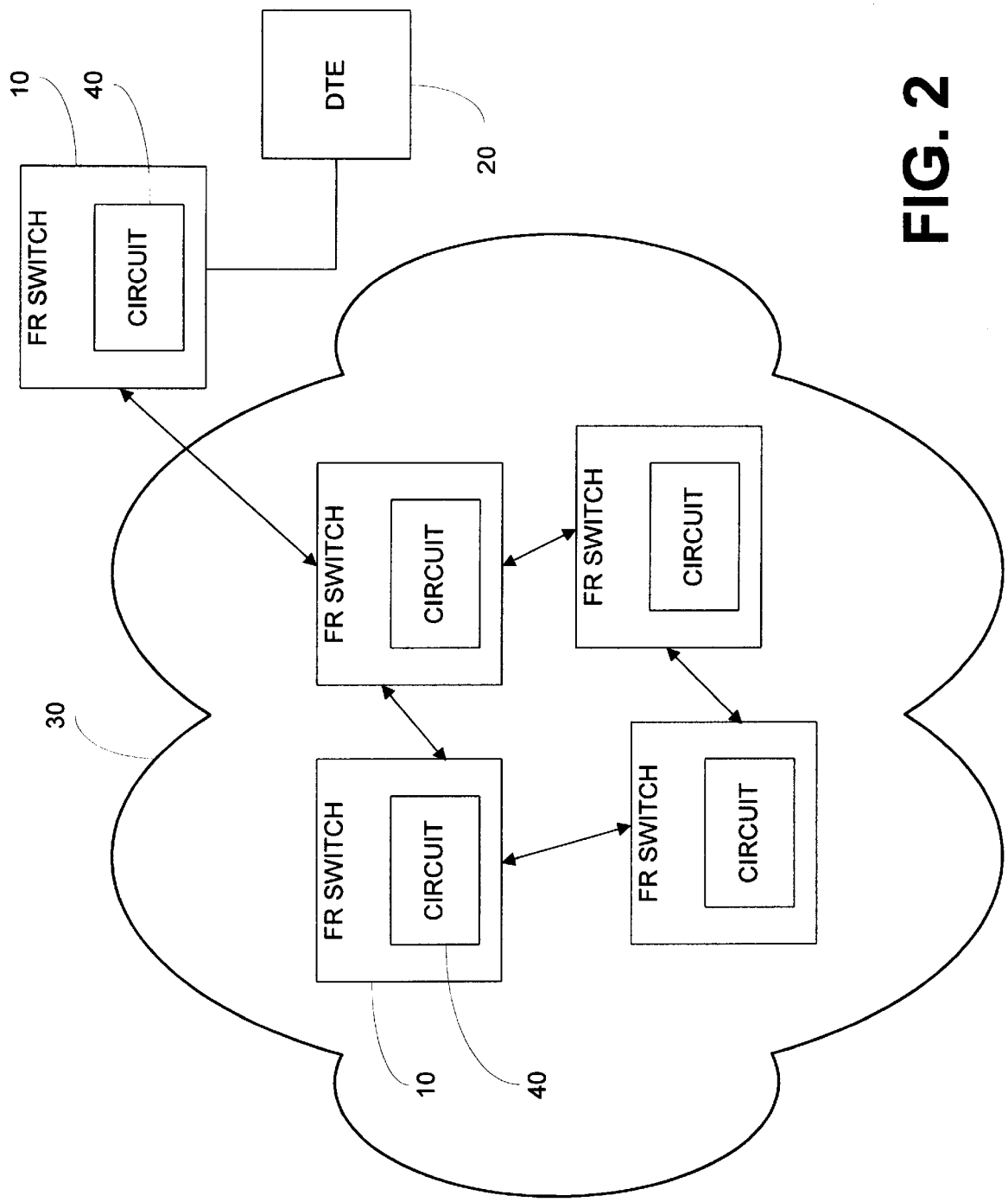
FIG. 2 is a simplified high level schematic diagram illustrating the use of the circuit of the present invention in a frame relay access device having a frame relay switch to switch frame relay signals within the frame relay network.

FIG. 2 is a simplified high level schematic diagram further illustrating the use of the present invention to switch frame relay signals within the frame relay network 30. As in FIG. 1, a frame relay access device 10, whose switching functions are implemented by circuit 40, is used to connect DTE 20 to the frame relay network 30. Frame relay signals are switched within the frame relay network 30 by a number of frame relay access devices 10, whose switching functions are implemented by the circuit 40 of the present invention.

Figure 3:
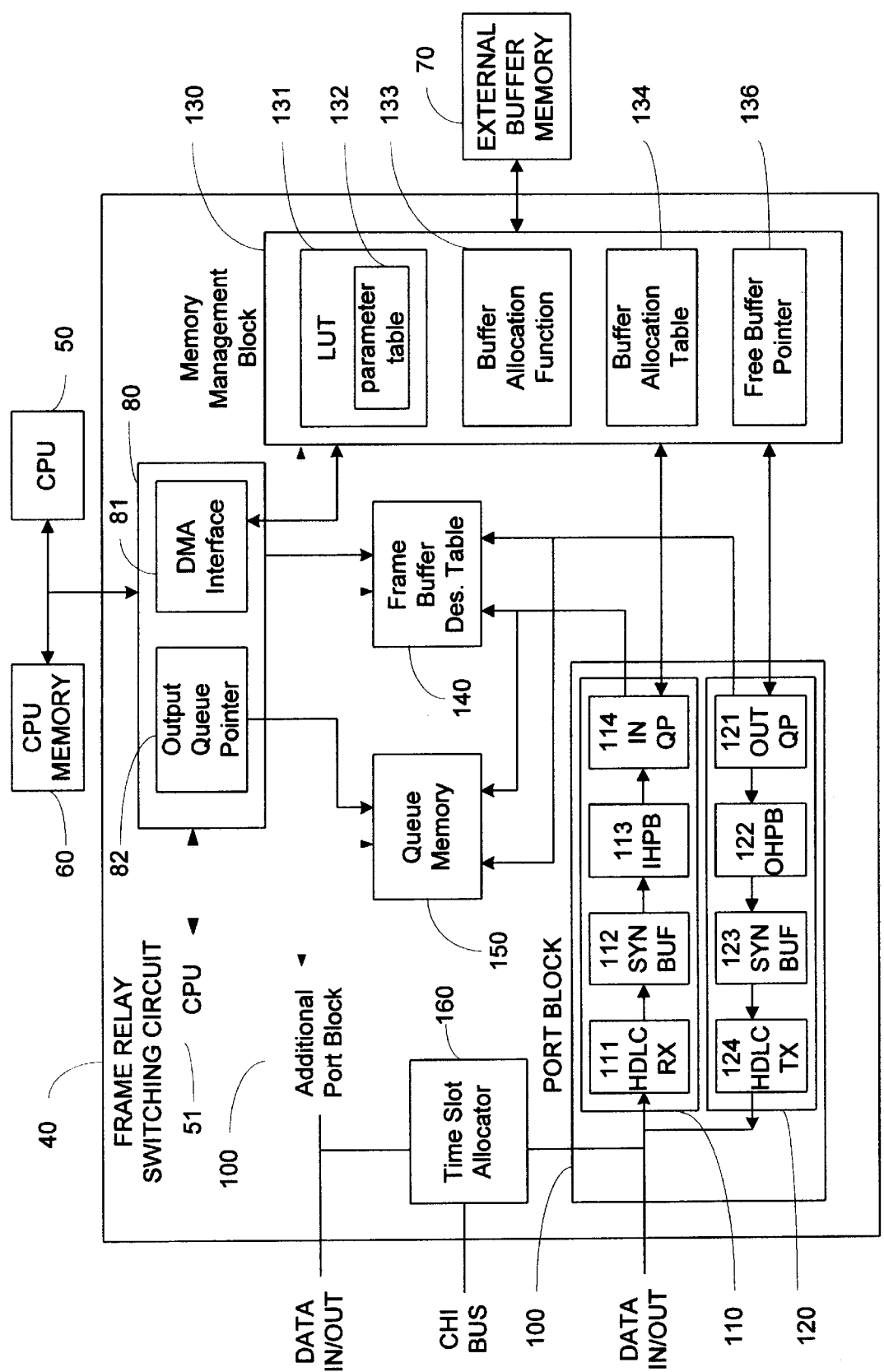
FIG. 3 is a simplified high level block diagram illustrating the blocks internal to the circuit of the present invention along with external support devices.

FIG. 3 is a high level block diagram illustrating the blocks internal to circuit 40 along with external support devices. In a preferred embodiment, the circuit 40 of the present invention is configured as an application specific integrated circuit (ASIC). In one embodiment of the invention, an external CPU 50 having an external CPU memory 60 is provided to configure the circuit 40 and to support real-time processing of interrupts, probing, LMI, etc. The circuit 40 interfaces with the CPU 50 and CPU memory 60 through a CPU interface port 80. In a second embodiment of the invention, the circuit 40 is configured with an internal processor 51. In another embodiment, the circuit 40 is configured as an ASIC and the internal processor 51 is an embedded processor, such as an Advanced RISC Machine™ (ARM) processor.

An external buffer memory 70 is used to buffer the frame relay traffic being switched. In one embodiment of the circuit 40, the external buffer memory 70 is a 128Kx8, 20 ns, static RAM chip, logically organized by the circuit into 1024 buffers, each 128 bytes in size. The circuit's processing performance is largely dependent on the speed of the bus to external memory, and how efficiently it can be used. It is estimated that maximum performance of an implementation of the present invention in an ASIC using a 20 ns RAM, and 8 ports, would be 400,000 packets/second, assuming 100-byte packets.

The assumption of 100-byte packets leads to a memory buffer size of 128-byte segments in the external buffer memory 70. Frame payload data (not headers) is stored in the external memory buffers. Frame payload sizes of less than 128 bytes will result in wasted space within a buffer. Frame payload sizes of greater than 128 bytes will result in multiple 128-byte buffers being allocated to hold the payload.

One or more identical port blocks 100 within the circuit perform input and output processing. The input processing block 110 is comprised of an HDLC receiver block 111, a synchronization buffer block 112, an inbound header processing block 113, and an input queue pointer 114. The output processing block 120 is comprised of an output queue pointer 121, an outbound header processing block 122, a synchronization buffer block 123, and an HDLC transmitter block 124.

The circuit has a memory management block 130 comprised of a look up table (LUT) 131 having a parameter table 132, a buffer allocation functional block 133, a buffer allocation table 134, and a free buffer pointer 136. The circuit 40 also has a frame buffer descriptor (FBD) table 140 and a queue memory 150. The queue memory 150 has an input queue 151 (shown in FIGS. 4 and 6) associated with the input queue pointer 114, an output queue 152 (shown in FIGS. 4–6) associated with the output queue pointer 121, as well as a free queue list 153 having an associated free queue pointer 154 (shown in FIG. 6).

The input and output queues of the queue memory 150, and the frame buffers associated with the buffer allocation table 134 are constructed as linked lists. A linked list is a data structure in which each item of the list consists of a data component and a pointer or link to the next item in the list.

For input processing, the input processing block 110 receives an HDLC frame signal 111, where the HDLC header is checked and removed, buffers the input data stream for synchronization purposes 112, processes the frame relay header 113, and stores the frame relay payload in external memory 70 through the memory management block 130. A record of the frame stored in external memory 70 is made in the FBD table 140. A pointer to the frame record in the FBD table 140 is placed in the input queue 151 in the queue memory 150 pointed to by the input queue pointer 114.

For output processing, the output processing block 120 receives a pointer from the output queue 152 pointed to by the output queue pointer 121, receives frame relay payload data from external memory 70 through the memory management block 130, processes the frame's outbound header 122, buffers the assembled frame for synchronization purposes 123, and transmits the frame using HDLC formatting 124. Each item in the output queue 152 in the queue memory 150 contains a pointer to the record of the frame in the FBD table 140.

Processing Flow

The circuit's input processing flow is described in more detail with reference to FIG. 3 in conjunction with FIG. 4, which is a block diagram of the received data processing flow in the input processing block 110 of FIG. 3.

The circuit's output processing flow is described in more detail with reference to FIG. 3 in conjunction with FIG. 5, which is a block diagram of the transmitted data processing flow in the output processing block 120 of FIG. 3.

Incoming port data processing flow:

With reference to FIG. 3, the input processing block 110 takes data from the HDLC receiver 111 and processes and strips multiple layers of headers according to the enabled processing options until the payload data is reached. The payload data is then stored in external buffer memory 70, and then the frame buffer descriptor pointer is passed to the output queue 121 of the output processing block 120.

The parameter table section 132 of the circuit's LUT 131 is configured by software to inform the circuit 40 which processing options are enabled (EDLCI, FRF.11, FRF.12 etc.) for each port/DLCI/EDLCI/channel identification (CID). As each frame is received, the parameter table 132 is accessed as part of the LUT 131 access to determine whether that layer of processing is required, the extent of processing required, etc.

Figure 4:
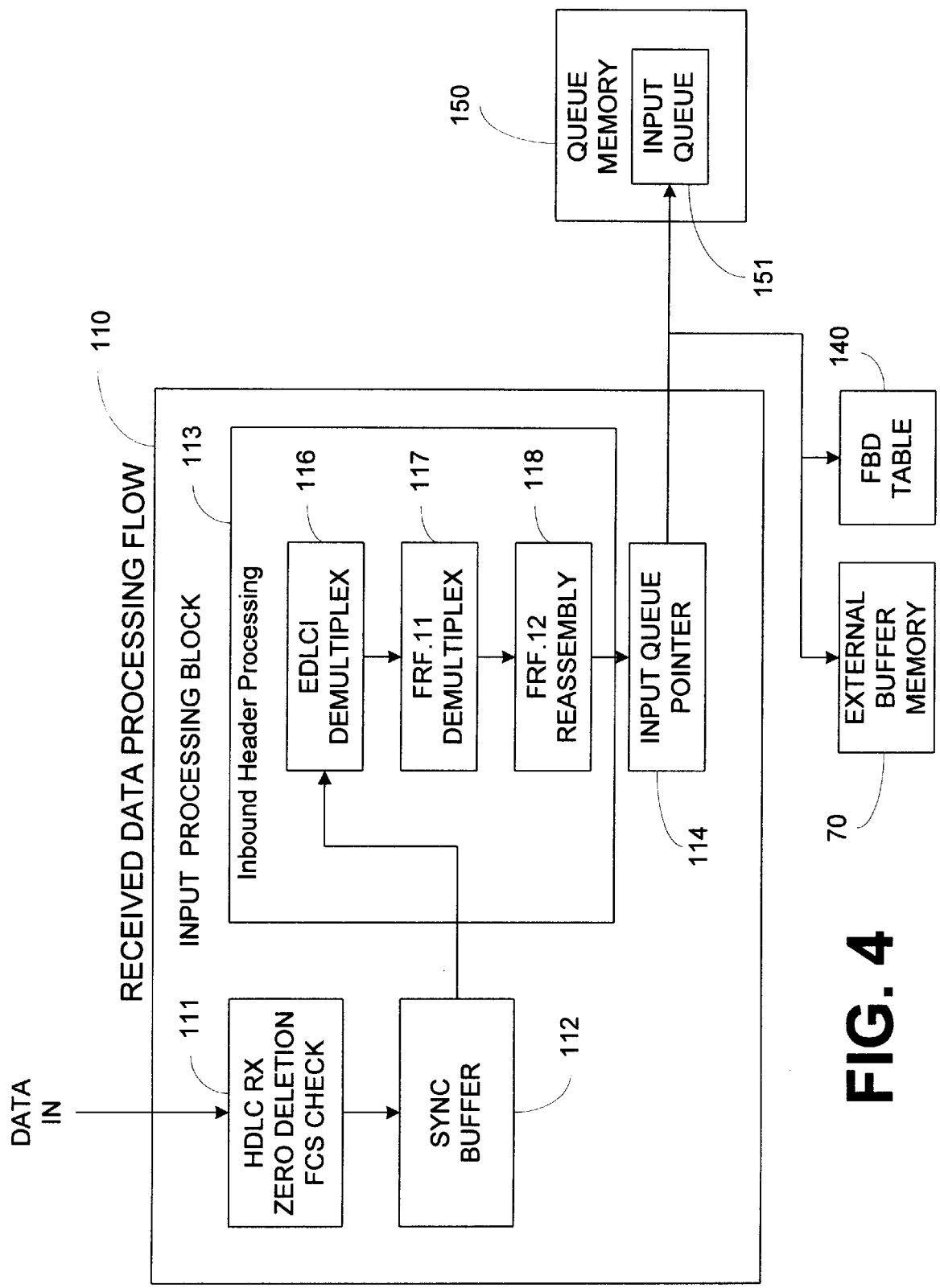
FIG. 4 is a simplified block diagram illustrating the received data processing flow (input processing) of FIG. 3 in greater detail.

With reference to FIGS. 3 and 4, the received data processing flow consists of the following steps:

HDLC data reception, zero deletion, Cyclic Redundancy Check (CRC) checking, and conversion to 8-bit parallel data 111;

Buffering for synchronization purposes 112;

Inbound header processing 113, which may include EDLCI demultiplexing 116, FRF.11 demultiplexing 117, and FRF.12 reassembly 118, depending on the processing options enabled in the LUT's 131 parameter table 132; and Allocating a record for the frame in the FBD table 140 and placing a pointer to the frame buffer descriptor record in the input queue 151 of the queue memory 150 pointed to by the input queue pointer 114.

After being processed by the input processing block 110, the frame payload is stored in the external buffer memory 70. The frame buffer descriptor pointer is passed to the output queue 152 of the queue memory 150 that is pointed to by the output queue pointer 121 of the output processing block 120 according to the frame priority in the LUT 131. The output queue 152 is partitioned into four priority partitions with a pointer associated with each priority.

Outgoing port data processing flow:

With reference to FIG. 3, when the payload data is retrieved from the external buffer RAM 70, the output processing block 120 adds layers of headers to the payload data and passes the frame to the HDLC transmitter 124.

Depending on the processing options enabled in the LUT's 131 parameter table 132, outgoing frames will be FRF.12 fragmented, FRF.11 fragmented, FRF.11 formatted (but not multiplexed with other subchannels), and EDLCI multiplexed.

Figure 5:
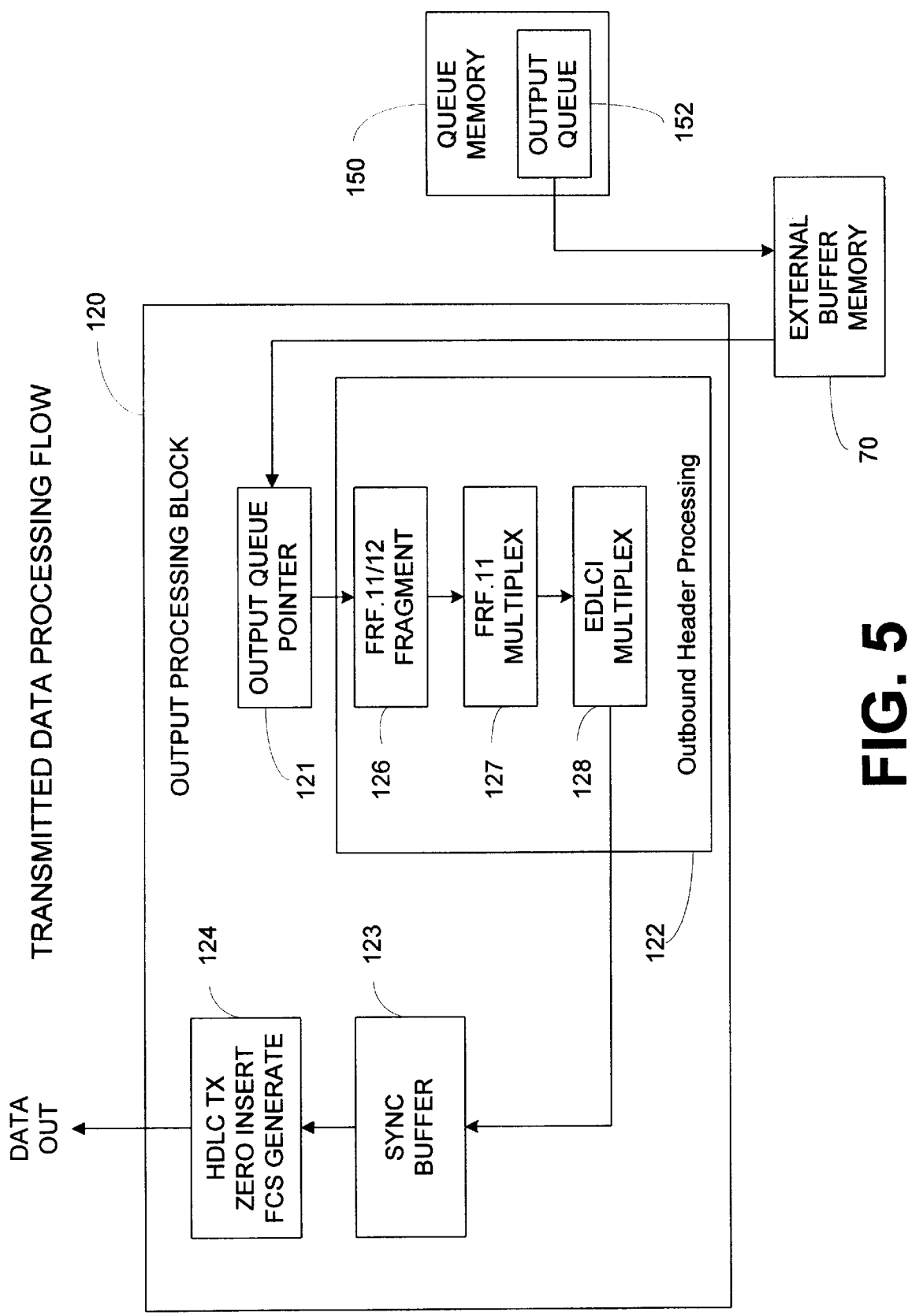
FIG. 5 is a simplified block diagram illustrating the transmitted data processing flow (output processing) of FIG. 3 in greater detail.

With reference to FIGS. 3 and 5, the transmitted data processing flow consists of the following steps:

Retrieval of frames stored in external buffer memory 70 that are pointed to by the output queue pointer 121 in order of the highest priority partition first;

Outbound header processing 122, which may include FRF.11/FRF.12 fragmentation 126, FRF.11 multiplexing 127, and EDLCI multiplexing 128, depending on the processing options enabled in the LUT's 131 parameter table 132;

Buffering for synchronization purposes 123; and

HDLC data transmission, including zero insertion, CRC calculation, and parallel-to-serial conversion 124.

HDLC Transmitter/Receiver

With reference to FIGS. 3 and 4, the HDLC receiver 111 is responsible for serial-to-parallel data conversion, flag detection, zero deletion, and frame check sequence (FCS) CRC checking.

With reference to FIGS. 3 and 5, the HDLC transmitter 124 is responsible for parallel-to-serial data conversion, flag generation, zero insertion, and frame check sequence (FCS) CRC generation. As the frame is transmitted, the circuit calculates the FCS and appends the FCS bytes to the end of the frame.

Q.922 Header Processing

With reference to FIGS. 3 and 4, the inbound header processing block 113 checks the headers of all incoming frames for validity. All valid frames are expected to start with the Q.922 header. All received frames are processed to at least the extent of obtaining the DLCI, Forward Explicit Congestion Notification (FECN), Backward Explicit Congestion Notification (BECN), Discard Eligibility (DE), and extended address (EA) bits. The frame is then switched to the appropriate output port.

With reference to FIGS. 3 and 5, the outbound header processing block 122 adds the DLCI, FECN, BECN, DE and EA bits to outgoing frames as part of the Q.922 header.

EDLCI Processing

If enabled, EDLCI processing occurs after processing of the Q.922 header containing the DLCI. With reference to FIGS. 3 and 4, EDLCI demultiplexing is performed in the inbound header processing block 113. If the EDLCI demultiplexing is disabled, no mux header is expected, and no special EDLCI processing is performed. If EDLCI demultiplexing is enabled and the flag character (x "AA") is not present in the first byte, the frame does not contain a multiplexing header and is assumed to be using EDLCI 0. If the flag character is present in the first byte, the second byte is examined. If the second byte is also a flag, then the first byte is removed (transparent frame), and the frame is assumed to use EDLCI 0. If the second byte is not a flag, then the second byte is processed to obtain the EDLCI address (1–63) and type fields. The EDLCI field is then used in conjunction with the input port and DLCI information in a look-up table operation to obtain the output port/DLCI/EDLCI information. The frame buffer descriptor record for this frame is updated with this information so that the frame can be properly switched.

With reference to FIGS. 3 and 5, EDLCI multiplexing is performed in the outbound header processing block 122 using the same method described above. If multiplexing is not enabled for a given DLCI, data is passed through with no EDLCI processing. If EDLCI multiplexing is enabled, and EDLCI 0 is selected for output, and the first byte of data contains x "AA", the circuit will insert another x "AA" in front of the data to create a transparent frame. If EDLCI multiplexing is enabled, and EDLCI 0 is selected for output, and the first byte of data does not contain x "AA", the data is passed through with no EDLCI processing. If any other EDLCI is selected, the flag character will be added, followed by the multiplexing header containing the EDLCI.

FRF.11 Processing

With reference to FIGS. 3 and 4, FRF.11 demultiplexing is performed in the inbound header processing block 113 as follows. The sub-frame header is processed to obtain the extension indication (EI), length indication (LI), and CID fields. Depending on the values of the EI and LI bits, the payload type and payload length fields may also be obtained in subsequent header bytes.

If the payload type is not present (EI=0, or implicit primary payload) or the payload type is explicitly a 0, the subchannel is a primary payload type, and uses either the data transfer syntax, fax relay transfer syntax, or voice syntax. For the data transfer syntax, if reassembly is enabled, the circuit automatically reassembles the payload fragments in memory per FRF.11 guidelines and switches the completely assembled frame to the destination specified in the LUT. Since the headers do not provide enough information to differentiate between data transfer syntax, fax relay transfer syntax, or voice syntax, the system must be configured to provide unique CID's for each syntax type so that proper switching and reassembly can take place.

If the payload type is anything but primary payload, or is primary payload but not data transfer syntax, the subchannel header and payload are delivered to the appropriate output port/DLCI combination (usually the CPU port, or a dedicated port to the voice processor), based on a look-up table operation, without any further processing. The circuit is not designed to process non-data FRF.11 frames to any extent.

With reference to FIGS. 3 and 5, outgoing FRF.11 frames are processed in the outbound header processing block 122 as follows:

(1) Non-data syntax frames: Since the circuit does not perform any significant voice processing, voice frames must be provided to the circuit (via the CPU port or a dedicated port from the voice processor) pre-fragmented and complete with FRF.11 sub-channel header (including sequence numbers) and payload. The circuit adds the EDLCI header, if required, and Q.922 header, and transmits the frame.

(2) Data syntax frames: The circuit automatically fragments the payload of outgoing data frames (if enabled, according to FRF.11 guidelines) and adds a sequence number, as well as the sub-frame header. The circuit then adds the EDLCI header, if required, and Q.922 header, and transmits the frame.

FRF.12 Processing

FRF.12 fragmentation and reassembly can occur on non-FRF.11 PVC's, and on FRF.11 PVC's that require User-to-Network (UNI) or Network-to-Network (NNI) fragmentation.

The circuit supports a programmable FRF.12 fragment size for each port. All outgoing frames on the port will have their data fragmented to that size, if fragmentation is enabled for that port/DLCI/EDLCI/CID tuple, per FRF.12 guidelines.

If FRF.12 fragmentation and FRF.11 fragmentation are enabled on the same frame, the FRF.11 fragment size will automatically be calculated from the FRF.12 programmable fragment size, so that the FRF.11 frame does not get fragmented a second time by FRF.12 processing.

The circuit creates a frame buffer descriptor (FBD) for incoming frames that require FRF.12 reassembly, and allocates buffers in external memory 70. When the circuit receives subsequent fragments, the circuit does not create new FBD's. Instead, the circuit performs a search of the input queue 151 to find the existing FBD for that frame, and the payload of the fragment is appended to the existing buffer in external memory. The circuit dynamically allocates new buffers if required to store the new fragment.

The circuit compares the sequence numbers of incoming fragments to detect the loss of fragments. In the event of a lost fragment, the circuit frees the buffers for the entire frame, deallocates the FBD, and reports an error to the CPU.

Internal Memory Data Structures

Figure 6:
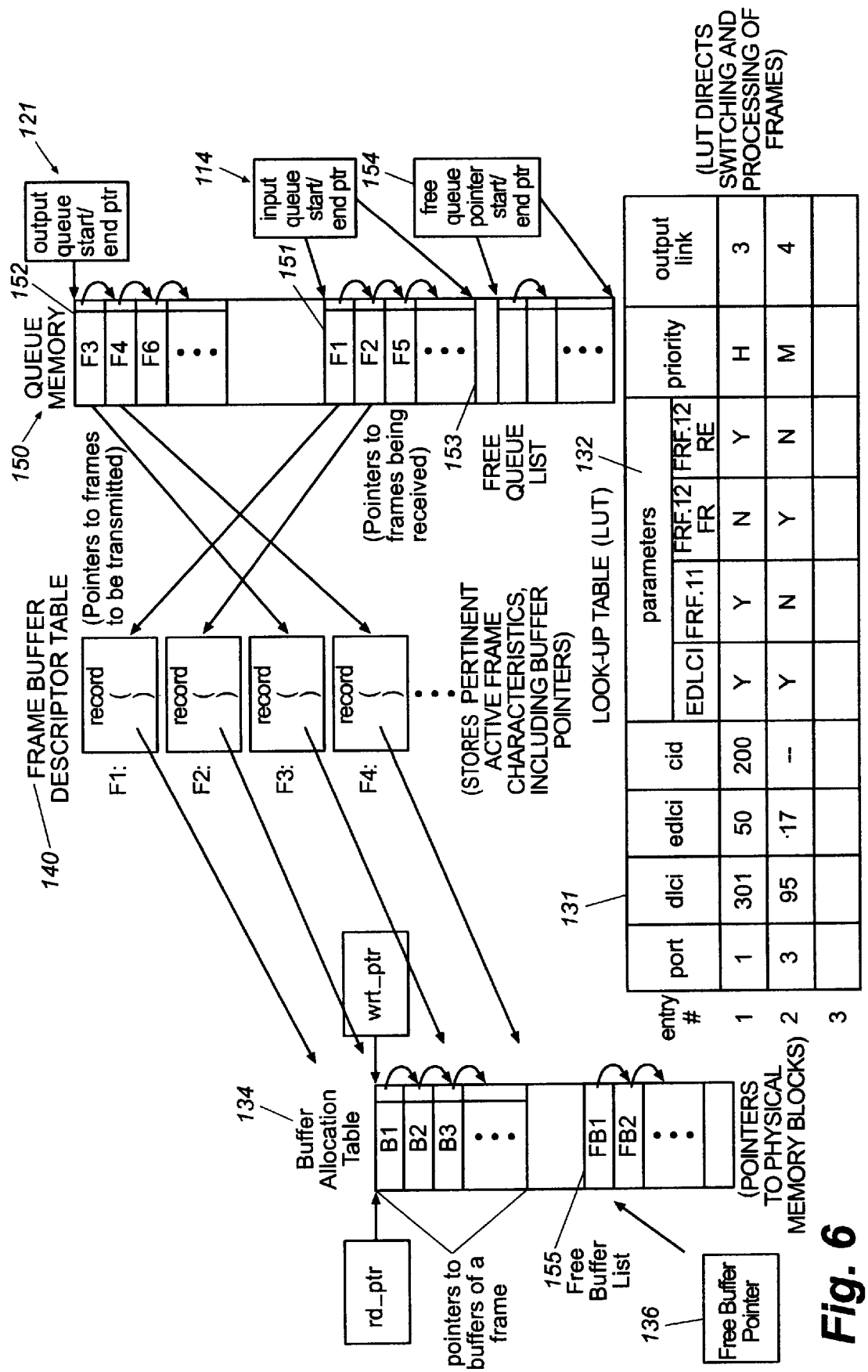
FIG. 6 is a simplified schematic diagram illustrating in greater detail, the internal memory structures of FIG. 3, including the look-up table (LUT).

As shown in FIG. 3, the circuit 40 has a memory management block 130 and a FBD table 140. FIG. 6 is a simplified schematic diagram illustrating the circuit's internal memory data structures in more detail, including an illustration of the look-up table (LUT) 131. FIG. 7 is an illustration of the FBD table 140.

With reference to FIGS. 6 and 7, the circuit's internal memory structures keep information pertinent to the frame relay traffic in the external memory buffers, including the status of the frames, address (DLCI) remapping, FRF.11, FRF.12, and EDLCI multiplexing/demultiplexing configuration, and FRF.11 and FRF.12 fragmentation/reassembly status. These include the queue memory 150 containing the input and output queues associated with each port 100, the buffer allocation table 134 of the memory management block 130, and the FBD table 140.

The memory management block 130 functions in conjunction with the input queue 151 and output queue 152 associated with the port block 100, and the FBD table 140, as follows: As described above, new incoming frames are processed and entered into the input queue 151 in queue memory 150 that is pointed to by the input queue pointer 114. This is accomplished by obtaining a frame pointer from the free queue list 153 associated with the input and output queues in the queue memory 150. The free queue list 153 keeps track of the number and location of the remaining free frame pointers. The circuit can support up to 512 active frames in memory at one time.

The frame pointers point to entries in the frame buffer descriptor table 140. This table uses record structures to store information pertaining to the status of frames that are being received or transmitted, including pointers to the buffers in external memory 70 in which the frame payload is actually stored.

Each time a new buffer needs to be dynamically allocated in external memory, a function is executed which obtains a pointer to the next empty buffer from the free buffer list 155 pointed to by the free buffer pointer 136. The buffer pointers point to address blocks in the external buffer memory 70. The circuit is designed to support up to 1024 128-byte buffers. Once a buffer has been allocated, the circuit stores received payload bytes in the external buffer memory 70. If a buffer becomes full and more data needs to be stored, a new buffer is allocated. Multiple buffers allocated to a frame are linked together by a linked list structure contained in the buffer allocation table 134. The FBD table 140 contains the index to the current buffer of the frame being written to or read from as allocated in the buffer allocation table 134. Each entry in the buffer allocation table contains the index to the next buffer of the frame. The index together with the byte offset in the FBD table 140 is used to construct the address of the current byte of the frame. The free buffer list 155 is similarly maintained to keep track of available buffers in the external buffer memory 70.

The frame pointer is transferred to the output queue 152 pointed to by the port block's 100 output queue pointer 121 at a specific point in time for each of the following cases:

1. Symmetrical input and output port rates—The frame pointer is placed in the output queue 152 as soon as the header has been received with a cut through value of zero set in the FBD table 140;

2. Asymmetrical input and output port rate without fragmentation—The frame pointer is placed in the output queue 152 after the entire frame has been received with a cut through value of zero set in the FBD table 140;
3. Asymmetrical input and output port rate with fragmentation—The frame pointer for each fragment is placed in the output queue 152 at each interval of the fragment size in the inbound payload with a cut through value determined by the fragment size and the ratio of input to output port rates set in the FBD table 140.

Cases 1 and 3 minimize the latency experienced by the frame packets going through the circuit.

Which port output queue the frame pointer is transferred to is determined by a LUT 131 reference to map the received input port/DLCI/EDLCI/CID tuple to the corresponding output tuple.

The frame pointer in the output queue 152 continues to point to the data structure in the FBD table 140. Frames that enter the output queue 152 first undergo priority resolution. The priority of the outgoing frame's DLCI is obtained from the LUT 131. Frame pointers for outgoing frames are inserted into the output queue. Each level of priority has a separate start/end pointer pair to shorten the length of the insertion operation. A new entry in the output queue 152 is added to the end of the list for the same priority.

The highest priority frame in the output queue 152 for a given port is transmitted by that port until the frame has been completely transmitted. Payload data is obtained from the external buffer memory 70. Once buffers are read out completely, they are no longer needed, and their pointers are placed back in the free buffer list 155. Likewise, the buffer pointer in the FBD table 140 is updated to point to the next buffer in the linked list chain for that frame. Once a frame has been completely read out and transmitted, the frame pointer is returned to the free queue list 153 in the queue memory 150 for future use.

In the event of an out-of-memory condition, such as if no more free buffer pointers to external buffer memory 70 are available, or no more frame pointers in the queue memory 150 are available, the incoming frame will be discarded, and an interrupt generated to the CPU.

Probe and Copy Operations

The circuit is capable of supporting probe and copy operations. In this implementation, a probe is identical to a copy operation. The probe (i.e., a single-port copy) can be directed to the CPU port, or any of the serial ports. The copy operation can also be performed as a broadcast operation to any combination of ports in the circuit.

For each probe or copy to be performed, software must configure the LUT 131 in the circuit with multiple entries containing the same source port/DLCI/EDLCI/CID tuple, but with different output tuples. The circuit recognizes this as a probe or copy operation and copies the frames to the designated multiple destinations.

The circuit accomplishes this by creating a new entry in the FBD table 140 for each destination. Normally, each FBD entry points to a separate set of external memory buffers which comprise the frame, but probe and copy FBD entries point to the same set of external memory buffers, since the frame data stored in memory is the same for each destination. Normally, external memory buffers are freed after transmission by returning the buffer pointer to the free buffer list, but this is not possible with probe and copy operations because multiple output destinations are dependent on the same data buffer, and they cannot be guaranteed to transmit the data at the same time or the same rate. Therefore, a 4-bit counter field is associated with the buffer allocation table 134 entries to support probe and copy operations. The counter field maintains a count of how many destination addresses (up to 15) are dependent on the data in the buffer.

When a frame is received, the circuit creates an entry in the FBD table 140 and allocates a buffer in the external memory 70 to store the frame data. If the circuit determines that this frame is being probed or copied, it also increments the 4-bit counter field associated with the buffer allocation table entries.

As each port completes transmission of a buffer, the circuit performs a test to determine if the external memory buffer pointer can be returned to the free buffer list 155. The port decrements the 4-bit counter field. If the counter value is non-zero, then the frame is still being transmitted by another port. If the counter value is zero, then the buffer can safely be freed by the pointer being returned to the free buffer list.

This method supports a frame being copied to multiple addresses on the same port, or multiple addresses on separate ports.

DMA Interface

To support probing, LMI, and management PVCs, the circuit also provides a port that is dedicated to the CPU. This CPU port 80, having a DMA interface 81 and an output queue pointer 82 is depicted in FIG. 3. Switching operations to/from the CPU port 80 are treated no differently by the internal hardware than they would be for any serial port, except that no input queue is required for the CPU port 80. This is because an input queue is only necessary for performing reassembly of fragmented packets, which is not required in the CPU port 80.

Figure 8:
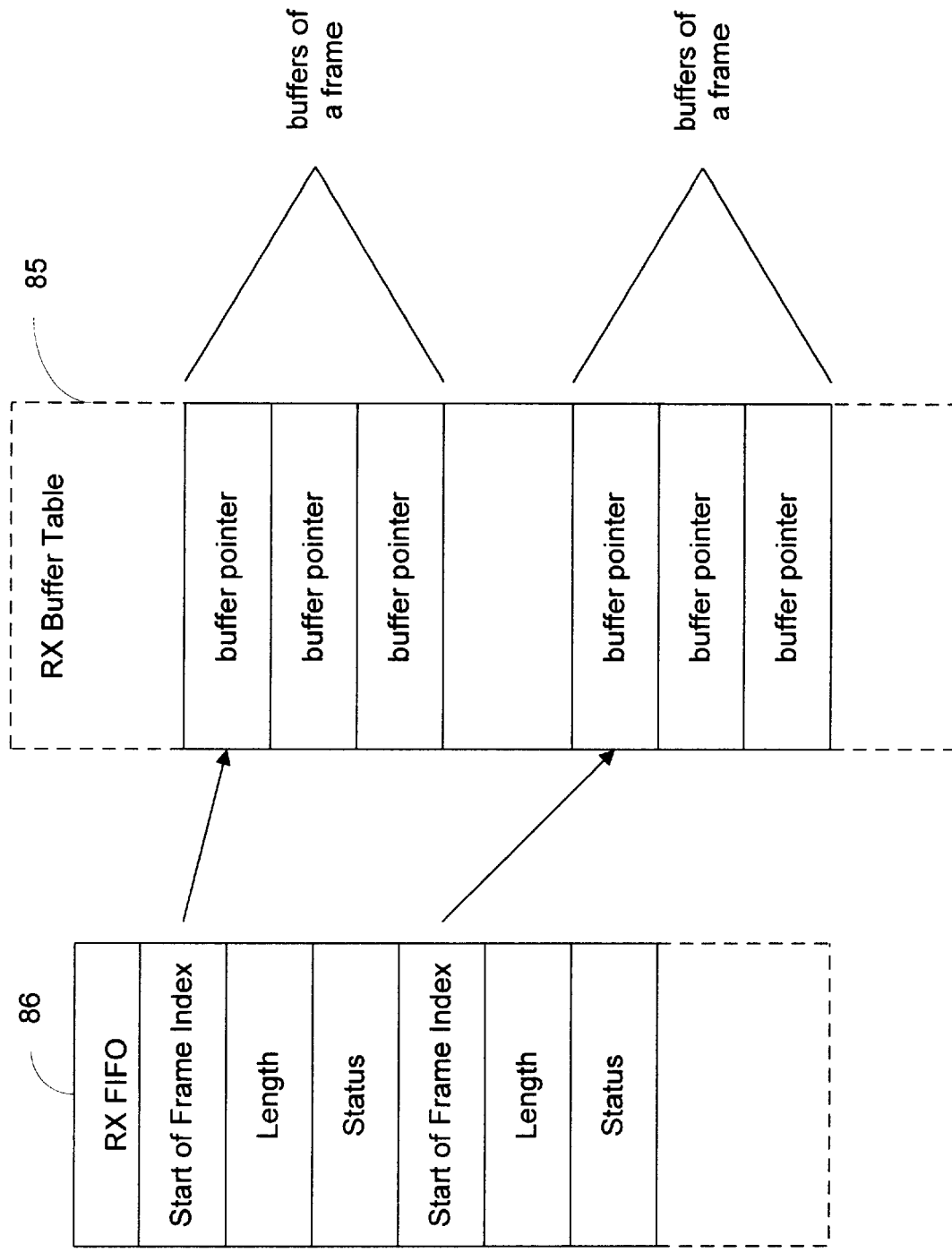
FIG. 8 is a simplified block diagram illustrating the direct memory access (DMA) transfer of frames from a circuit port to the central processor unit (CPU).
Figure 9:
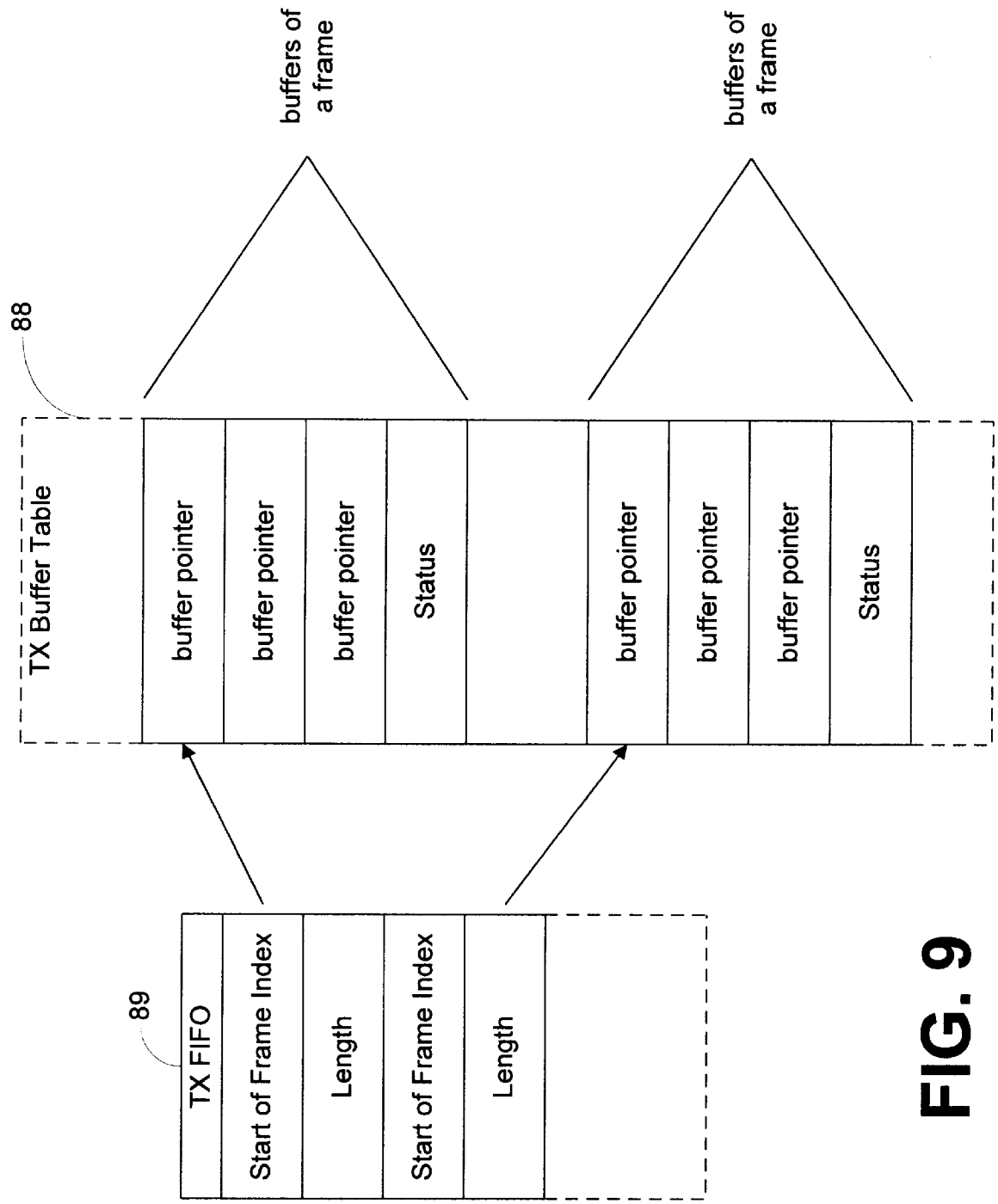
FIG. 9 is a simplified block diagram illustrating the DMA transfer of frames from the CPU to a circuit port.

Although the following description is directed to an embodiment having an external CPU 50, it is equally applicable to an alternative embodiment having an internal CPU 51. With reference to FIGS. 3, 8 and 9, the CPU 50 can set up the transfer of multiple frames at one time, thus allowing the CPU more time to respond to the servicing of frame transfers. A special area of CPU memory 60 must be dedicated to transfers between the CPU 50 and circuit 40. A small FIFO buffer is provided to support burst transfer of data to and from CPU memory for more efficient DMA transfers using the CPU bus. Frames switched to the CPU port cause the frame to be stored in CPU memory.

The DMA transfer is accomplished using a RX Buffer Table 85 and RX Frame FIFO 86, which are depicted in FIG. 8, together with the CPU 50 and CPU memory 60 of FIG. 3. The CPU 50 sets up the transfer of a frame switched to the CPU 50 by storing the pointers to the linked list of available buffers in CPU memory 60 in the RX Buffer Table 85. The circuit 40 examines the output queue in the queue memory 150 that is associated with the output queue pointer 82 of the CPU port to determine if a received frame needs to be sent to the CPU 50. The circuit obtains the next available buffer from the RX Buffer Table 85 and performs a DMA transfer of a buffer from its buffer memory to the location in CPU memory 60. The process continues until the last buffer of the frame has been transferred. At this point, the circuit writes the index of the start of the frame in the RX Buffer Table 85, writes the length of the frame in bytes and the status to the RX Frame FIFO 86, and interrupts the CPU 50. The CPU 50 reads the RX Frame FIFO 86 to determine the location of the frame. The CPU 50 then updates the RX Buffer Table 85 in a circular fashion as new buffers become available. The pointers point to a total of 256 128-byte blocks in CPU memory 60. The circuit generates a 32 bit address on the CPU bus. The lower 24 bits are provided by the pointer in the RX Buffer Table 85. The eight most significant bits are a constant set by the CPU 50. A 16 bit value is allocated for the frame length in bytes. The entire frame is transferred excluding the opening and closing flag and CRC byte.

Frames sent from the CPU 50 to the circuit's output port 120 are performed by transferring the frame from CPU memory 60 to the circuit's external buffer memory 70, generating a FBD table 140 entry for the frame, and placing an entry in the output queue associated with the output port's 120 output queue pointer 121. The DMA transfer is accomplished using a TX Buffer Table 88 and TX Frame FIFO 89 as shown in FIG. 9. The CPU 50 sets up the transfer of a frame switched to the port by storing the pointers to the frame buffers in CPU memory 60 in the TX Buffer Table 88 and writing the index of the start of the frame and its length. The circuit allocates a status word in the table to indicate to the CPU 50 that a frame has been transferred. Upon detecting a non-empty TX Frame FIFO 89, the circuit reads the FIFO to obtain the start of the frame buffers. A DMA transfer of the buffer from CPU memory 60 then occurs. The process continues until the last byte of the last buffer is transferred. At this point the circuit updates the status word and generates an interrupt. The CPU examines the status words in the TX Buffer Table 88 to determine which frames have been transferred. The CPU then frees the associated buffers for subsequent transfers. Frames from CPU include the Q.922 header and payload. The circuit performs the additional processing for multiplexing and fragmentation.

The circuit memory for the Buffer Tables holds 256 pointers. The memory is shared by the RX Buffer Table 85 and TX Buffer Table 88. The number of entries for the RX Buffer Table 85 and TX Buffer Table 88 are user defined.

Both the RX FIFO 86 and TX FIFO 89 are 16 entries deep to allow for the transfer of up to 16 frames without processor intervention.

Other Interfaces

The circuit may be configured with other interfaces as necessary for particular applications. In a preferred embodiment, the circuit has dual concentration highway (CHI) bus interfaces to provide flexibility and to support use of the circuit with existing products. The CHI bus is a time division multiplexed serial data stream consisting of 64 8-bit time slots per frame. A time slot allocator 160 (depicted in FIG. 3) allows any multiple of time slots on one of the two concentration highways to be assigned to one of the circuit's serial ports. When the CHI bus is enabled for a given port, the normal port serial I/O signals are disabled. Other special interfaces can be implemented if necessary.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

Now, therefore, the following is claimed:

1. A circuit for switching frame-relay signals, said circuit comprising:
    a receiving means for receiving high-level data link control (HDLC) signals, each HDLC signal having a header;
    an input processing means for real-time concurrent multiple processing of the HDLC signals;
    a storing means for storing the HDLC signals processed by said input processing means;
    an output processing means for real-time concurrent multiple processing of the stored HDLC signals;
    a transmitting means for transmitting the HDLC signals; and
    an interfacing means for interfacing said receiving means, said input processing means, said storing means, said output processing means, and said transmitting means to a central processing unit (CPU).

2. The circuit of claim 1 wherein said circuit is an application specific integrated circuit (ASIC).

3. The circuit of claim 1, further comprising a CPU.

4. The circuit of claim 1, wherein said input processing means performs at least one of the following: Extended Data Link Control Identifier (EDLCI) demultiplexing, Voice Over Frame Relay Implementation Agreement FRF.11 (FRF.11) demultiplexing, and Frame Relay Fragmentation Implementation Agreement FRF.12 (FRF.12) reassembly.

5. The circuit of claim 1, wherein said output processing means performs at least one of the following: FRF.12 fragmentation, FRF.11 multiplexing, and EDLCI multiplexing.

6. The circuit of claim 1, further comprising a concentration highway (CHI) bus interface.

7. The circuit of claim 1 wherein said circuit switches a plurality of HDLC signals in parallel.

8. The circuit of claim 1, wherein said circuit switches a specific HDLC signal to a plurality of destinations.

9. The circuit of claim 1, wherein said circuit transmits the HDLC signals as soon as the header of each HDLC signal has been received and processed.

10. The circuit of claim 1, wherein said circuit transmits the HDLC signals in fragments.

11. The circuit of claim 1, wherein said circuit switches two or more HDLC signals.

12. The circuit of claim 11, further comprising a prioritizing means for performing priority resolution among said two or more HDLC signals.

13. An ASIC for switching frame-relay signals, the ASIC comprising:
    a receiving means for receiving HDLC signals, each HDLC signal having a header;
    an input processing means for real-time concurrent multiple processing of the HDLC signals;
    a storing means for storing the HDLC signals processed by said input processing means;
    an output processing means for real-time concurrent multiple processing of the stored HDLC signals;
    a transmitting means for transmitting the HDLC signals; and
    an interfacing means for interfacing said receiving means, said input processing means, said storing means, said output processing means, and said transmitting means to a CPU.

14. A circuit for switching frame-relay signals, said circuit comprising:
    a first processing block comprising a receiving means for receiving HDLC signals having a header and a first processing means for real-time concurrent multiple processing of the HDLC signals;
    a memory management block for managing the storage of the HDLC signals processed by said first processing means;

a second processing block comprising a second processing means for real-time concurrent multiple processing of the stored HDLC signals and a transmitting means for transmitting the stored HDLC signals after processing by said second processing means; and an interface block for interfacing said first processing block, said memory management block, and said second processing block to a CPU.

15. The circuit of claim 14, wherein said circuit is implemented in an application specific integrated circuit (ASIC).

16. The circuit of claim 14, further comprising a CPU.

17. The circuit of claim 14, wherein said input processing means performs at least one of the following: EDLCI demultiplexing, FRF.11 demultiplexing, and FRF.12 reassembly.

18. The circuit of claim 14, wherein said output processing means performs at least one of the following: FRF.12 fragmentation, FRF.11 multiplexing, and EDLCI multiplexing.

19. The circuit of claim 14, wherein said memory management block further comprises interfacing means for interfacing said memory management block with a memory external to said circuit.

20. The circuit of claim 14, further comprising a dual concentration highway (CHI) bus interface.

21. The circuit of claim 14 wherein said circuit switches a plurality of HDLC signals in parallel.

22. The circuit of claim 14, wherein said circuit switches a specific HDLC signal to a plurality of destinations.

23. The circuit of claim 14, wherein said circuit transmits the HDLC signals as soon as the header of each HDLC signal has been received and processed.

24. The circuit of claim 14, wherein said circuit transmits the HDLC signals in fragments.

25. The circuit of claim 14, wherein said circuit switches two or more HDLC signals.

26. The circuit of claim 25, further comprising a prioritizing means for performing priority resolution among said two or more HDLC signals.

27. A method for switching frame-relay signals, comprising the steps of:

receiving, in an ASIC, HDLC signals, the HDLC signals having a header;

performing real-time concurrent multiple input processing on the HDLC signals in said ASIC;

storing the input processed HDLC signals;

performing real-time concurrent multiple output processing on the stored HDLC signals in said ASIC; and transmitting the output processed HDLC signals from said ASIC.

28. The method of claim 27, wherein the input processing of said first performing step comprises at least one of the following: EDLCI demultiplexing, FRF.11 demultiplexing, FRF.12 reassembly, and FRF.12 fragmentation.

29. The method of claim 27, wherein the output processing of said second performing step comprises at least one of the following: FRF.12 fragmentation, FRF.11 multiplexing, and EDLCI multiplexing.

30. The method of claim 27, wherein said transmitting step transmits the output processed HDLC signals to a plurality of destinations.

31. The method of claim 27, wherein said transmitting step transmits the HDLC signals as soon as the header of each HDLC signal has been received and processed.

32. The method of claim 27, wherein said transmitting step transmits the HDLC signals in fragments.

33. A circuit for switching frame-relay signals, said circuit comprising:

a receiver configured to receive HDLC signals, each HDLC signal having a header;

an input processor configured to process real-time concurrent multiple HDLC signals;

a storage unit configured to store the HDLC signals processed by said input processing means;

an output processor configured to process real-time concurrent multiple HDLC signals;

a transmitter configured to transmit the HDLC signals; and an interface configured to interface the receiver, the input processor, the buffer, the output processor, and the transmitter to a CPU.

34. The circuit of claim 33 wherein the circuit is an ASIC.

35. The circuit of claim 33, further comprising a CPU.

36. The circuit of claim 33, wherein the input processor performs at least one of the following: Extended Data Link Control Identifier (EDLCI) demultiplexing, Voice Over Frame Relay Implementation Agreement FRF.11 (FRF.11) demultiplexing, and Frame Relay Fragmentation Implementation Agreement FRF.12 (FRF.12) reassembly.

37. The circuit of claim 33, wherein the output processor performs at least one of the following: FRF.12 fragmentation, FRF.11 multiplexing, and EDLCI multiplexing.

38. The circuit of claim 33, further comprising a concentration highway CHI bus interface.

39. The circuit of claim 33 wherein the circuit switches a plurality of HDLC signals in parallel.

40. The circuit of claim 33, wherein the circuit switches a specific HDLC signal to a plurality of destinations.

41. The circuit of claim 33, wherein the circuit transmits HDLC signals as soon as the header of each HDLC signal has been received and processed.

42. The circuit of claim 33, wherein the circuit transmits HDLC signals in fragments.

43. The circuit of claim 33, wherein the circuit switches two or more HDLC signals.

44. The circuit of claim 43, further comprising a prioritizing unit configured to perform priority resolution among the two or more HDLC signals.

45. An ASIC configured to switch frame-relay signals, comprising:

a receiver configured to receive HDLC signals, each HDLC signal having a header;

an input processor configured to process real-time concurrent multiple HDLC signals;

a storage unit configured to store the HDLC signals processed by said input processing means;

an output processor configured to process real-time concurrent multiple HDLC signals;

a transmitter configured to transmit the HDLC signals; and an interface configured to interface the receiver, the input processor, the buffer, the output processor, and the transmitter to a CPU.

46. A method for switching frame-relay signals, comprising the steps of:

receiving HDLC signals, each signal having a header;

performing real-time concurrent multiple input processing on the HDLC signals;

storing the input processed HDLC signals;

performing real-time concurrent multiple output processing on the stored HDLC signals; and transmitting the output processed HDLC signals.

47. The method of claim 46, wherein the input processing of the first performing step comprises at least one of the following: EDLCI demultiplexing, FRF.11 demultiplexing, FRF.12 reassembly, and FRF.12 fragmentation.

48. The method of claim 46, wherein the output processing of the second performing step comprises at least one of the following: FRF.12 fragmentation, FRF.11 multiplexing, and EDLCI multiplexing.

49. The method of claim 46, wherein the transmitting step transmits the output processed HDLC signals to a plurality of destinations.

50. The method of claim 46, wherein the transmitting step transmits the HDLC signals as soon as the header of each HDLC signal has been received and processed.

51. The method of claim 46, wherein the transmitting step transmits the HDLC signals in fragments.

* * * * *